United States Patent [19]
Imanaka

[11] Patent Number: 5,471,677
[45] Date of Patent: Nov. 28, 1995

[54] DATA RETRIEVAL USING USER EVALUATION OF DATA PRESENTED TO CONSTRUCT INTERFERENCE RULES AND CALCULATE RANGE OF INPUTS NEEDED FOR DESIRED OUTPUT AND TO FORMULATE RETRIEVAL QUERIES

[75] Inventor: Takeshi Imanaka, Katano, Japan

[73] Assignee: Matsushita Electric Industrial Co., Ltd., Kadoma, Japan

[21] Appl. No.: 81,634

[22] Filed: Jun. 24, 1993

[30] Foreign Application Priority Data

Jun. 24, 1992 [JP] Japan .................................. 4-165834

[51] Int. Cl.$^6$ ........................... G06F 17/30; G06F 17/15
[52] U.S. Cl. ........................... 395/600; 395/900; 395/61; 364/274.6; 364/282.2; 364/DIG. 1; 364/283.2
[58] Field of Search .................................. 395/600, 900, 395/61; 364/274.6, 282.2, 283.2, 974.3, 974.4

[56] References Cited

U.S. PATENT DOCUMENTS

| | | | |
|---|---|---|---|
| 4,853,843 | 8/1989 | Ecklund | 395/600 |
| 5,020,019 | 5/1991 | Ogawa | 395/600 |
| 5,168,549 | 12/1992 | Takage et al. | 395/3 |
| 5,197,005 | 3/1993 | Shuartz et al. | 395/600 |
| 5,237,502 | 8/1993 | White et al. | 364/419.01 |
| 5,251,288 | 10/1993 | Nomura et al. | 395/51 |
| 5,263,167 | 11/1993 | Conner, Jr. et al. | 395/600 |

OTHER PUBLICATIONS

T. Imanaka & N. Wakai, "Handling of Qualitative Attributes in Automatic Construction of Fuzzy Inference Rules by Using Input–Output Data", *8th Fuzzy System Symposium*, at pp. 233–236 (May 26–28, 1992).

E. Natio, I. Hayasi and N. Wakami, "Application of Fuzzy Theory to Controlling and Data Processing", *Joint Convention Record of Institutes of Electrical and Information Engineers*, at pp. 1–75 through 1–78 (Sep. 10–12, 1991).

Primary Examiner—Thomas G. Black
Assistant Examiner—Jack M. Choules
Attorney, Agent, or Firm—Ratner & Prestia

[57] ABSTRACT

A data retrieval apparatus capable of performing a high-speed data retrieval action in accordance with the subjective criteria of the user, e.g. human concepts of "convenient" and "proper", even if the amount of data stored in a database is large. The data retrieval apparatus includes: a data storage device for storing data; a dialogue device for displaying at least one data and allowing the user to enter an evaluation data corresponding to the displayed data; an inference rule construction device for generating an inference rule which can approximate the input-output relation between the displayed data designated as an input and the user evaluation data designated as an output; an input range calculation device for calculating a range of inputs which produce an output that satisfies given conditions under the inference rules constructed by the inference rule construction device; a retrieval command generation device for generating a data retrieval command according to the input range calculated by the input range calculation device; a retrieval execution device for performing a retrieval of data from the data storage device in response to the data retrieval command; and a data display device for displaying the retrieval result of the retrieval execution device.

13 Claims, 11 Drawing Sheets

DATA RETRIEVAL USING USER EVALUATION OF DATA PRESENTED TO CONSTRUCT INTERFERENCE RULES AND CALCULATE RANGE OF INPUTS NEEDED FOR DESIRED OUTPUT AND TO FORMULATE RETRIEVAL QUERIES

BACKGROUND OF THE INVENTION

The present invention relates to a data retrieval apparatus for retrieving desired data from a variety of databases and more particularly, to a data retrieval apparatus capable of performing a data retrieval action at high efficiency according to the subjective criteria or requirements of the user.

Advanced data retrieval methods have been developed for retrieving data in accordance with a personal standard of subjective judgment, e.g. human concepts like proper and convenient. In such data retrieval methods, a retrieval apparatus identifies specific criteria determined by user's requirements and executes a data retrieval action according to the criteria. For example, among them is a fuzzy retrieval system with a fuzzy connective operator depicted in "Construction of Fuzzy Retrieval System with Learning-type Fuzzy Connective Operator", the 1991 Electric and Information Institutes Joint Conference, Literature S4-1. The fuzzy connective operator is defined by Equation (1). Also, S and T in Equation (1) are expressed in Equation (2).

$$f(\vec{x}) = m \cdot S + (1 - m) \cdot T \quad (1)$$

where $\vec{x} = (x_1, \ldots, x_n)$ $$m = p_1 - \sum_{j=1}^{n} (p_1 - p_{j+1}) x_j$$

$$0 \leq p_1, \ldots, p_{n+1} \leq 1.0 \leq -(n-1)p_1 + \sum_{j=1}^{n} p_j \leq 1$$

$$T = 1 - \left[ 1 - \prod_{j=1}^{n} \{1 - (1 - x_j)^{p_{n+3}}\} \right]^{1/p_{n+3}}$$

$$S = \left[ 1 - \prod_{j=1}^{n} (1 - x_j^{p_{n+2}}) \right]^{1/p_{n+2}} \quad (2)$$

where $p_{n+2}, P_{n+3} > 0$

The fuzzy connective operator of Equation (1) is a variable in the function by changing the values of parameters p1, p2, ..., pn+3. The values of parameters are determined by a learning process in order to correspond to the subjective criteria. In Equation (1), x is the input data and m is the value determined by the input data x.

FIG. 11 illustrates a block diagram showing a prior art data retrieval apparatus using the fuzzy connective operator. As shown, there are provided a membership function input 101 for receiving membership functions which represent a part of the subjective criteria of a user, a memory 102 for storing the membership functions, a data storage 103 for storing data which consists of quantitative attributes, (e.g. the number of employees and the amount of monthly payment), a membership degree calculator 104 for calculating the degree of membership of each attribute of the data to the membership functions, an assembler 105 for aggregating the degrees of membership of the attributes using the fuzzy connective operator, a retrieval result display 106 for displaying retrieval results which have been selected from the data in response to the output of the assembler 105, a user evaluation input 107 for allowing the user to enter an evaluation value of the subjective criteria when the display indicates that the retrieval output fails to match the subjective criteria of the user, and a controller 108 for modifying the parameters of the fuzzy connective operator with the evaluation value.

The operation of the prior art data retrieval apparatus shown in FIG. 11 will be explained in more detail. Subjective data are entered by the user in the form of membership functions through the membership function input 101 into the data retrieval apparatus and transferred to the memory 102 for temporary storage. For example, when the data retrieval apparatus is designed for selecting a desirable hotel(s) from a database of accommodation facilities, the user who is looking for a business hotel may enter his subjective requirements, (e.g. a preferred distance to a location to be visited and a payable amount for hotel fee,) into the membership function input 101.

Then, the degrees of membership of the attributes of each storage data of the data storage 103 are examined by the membership degree calculator 104 in relation to the membership functions fed from the memory 102. More specifically, the degree of the membership of a data attribute, (e.g. the distance of a hotel to the location or the hotel fee), to the corresponding membership function is calculated. The degrees of membership of the attributes are aggregated in the assembler 105 using the fuzzy connective operator expressed by Equation 1.

Through observing the output of the assembler 105, a data which satisfies the given condition (for example, it is greater than a particular value) is retrieved and displayed on the retrieval result display 106. The retrieval result display 106 also indicates the output of the assembler 105 calculated by the fuzzy connective operator. The user then examined the displayed data and accepts it as a retrieved result when it satisfies the user criteria requirements.

If the displayed data fails to satisfy the user's subjective requirements, the user evaluation data determined personally by the user is entered into the user evaluation input 107. In response to the user evaluation data, a controller 108 changes the parameters ($P_1, \ldots, P_{n+3}$) of the fuzzy connective operator shown in Equation (1) to produce a more preferable output suited to the user's requirements. As set forth above, the prior art data retrieval apparatus is capable of changing the parameters of the fuzzy connective operator according to the user evaluation data which has been determined by the user in response to the uncompensated retrieval result. Accordingly, the data retrieval with the fuzzy connective operator can successfully be conducted according to the subjective criteria of the user.

However, in the prior art data retrieval apparatus, two intricate processes, calculation of the degree of membership of stored data to the membership functions entered by the user and aggregation of the degrees of membership using the fuzzy connective operator, have to be executed on all the stored data. As the stored data becomes large, the time required for retrieving them will be increased considerably.

Also, the prior art data retrieval apparatus displays the criteria used in the retrieval procedure in a manner which is not very clear to the user because the criteria are not expressed in the easily understandable form of retrieval conditions, (e.g. an order of size.) It is thus difficult for the user to acknowledge that the user evaluation data is correctly entered and treated by the data retrieval apparatus. Even if some of the retrieval conditions are possibly defined by equality and/or inequality statements, they cannot be entered directly into the data retrieval apparatus but only in the form of membership functions and user evaluation data.

SUMMARY OF THE INVENTION

It is a first object of the present invention, in view of data retrieval according to the subjective criteria of the user, to provide a data retrieval apparatus capable of performing a data retrieval action at high speed even if the amount of data stored is increased.

It is a second object of the present invention to provide a data retrieval apparatus which allows the user to review contents of subjective criteria or retrieval conditions and if desired, to modify them prior to the execution of a data retrieval action so that retrieval of unwanted data can be avoided.

It is a third object of the present invention to provide a data retrieval apparatus capable of storing a subjective criterion or requirements of the user in an easily understandable form of a data retrieval command for reuse so that an inefficient process such as generating an inference rule and its relevant data retrieval command to match the subjective criteria of each event can be avoided.

It is a fourth object of the present invention to provide a data retrieval apparatus which allows a data retrieval command, which has been generated and stored, to be modified to meet any variation of the subjective criteria of the user in the reuse after a long interval of time.

A data retrieval apparatus of a first embodiment of the present invention comprises: a data storage means for storing data; a dialogue means for displaying at least one data and allowing the user to enter an evaluation data corresponding to the displayed data; an inference rule construction means for generating an inference rule which can approximate the input-output relation between the displayed data designated as an input and the user evaluation data designated as an output; an input range calculation means for calculating a range of the input to produce the output which satisfies given conditions under the inference rules constructed by the inference rule construction means; a retrieval command generation means for generating a data retrieval command according to the input range calculated by the input range calculation means; a retrieval execution means for performing a retrieval of data from the data storage means in response to the data retrieval command; and a data display means for displaying the retrieval result of the retrieval execution means.

Also, a modification of the data retrieval apparatus is characterized in that the data storage means is adapted for dividing data into a plurality of classes of attributes and storing tile classes of the attributes as data sets, that the data retrieval command is expressed by a collection of retrieval conditions aggregated using a logical operator, such as a logical sum or product, which is capable of connecting a plurality of statements or assertions representing, for example, the ordering relationship, and that the input range calculation means is adapted for calculating, under the inference rules, a range of the input which is a subspace where an input data which produces an output of greater than a predetermined value exists, the subspace defined by a region of the space where a sum of the consequents of the inference rules is greater than the predetermined value.

A data retrieval apparatus of a second embodiment of the present invention further includes an explanation means for displaying the data retrieval command generated by the retrieval command generation means and a modification means for allowing the user to modify the data retrieval command displayed on the explanation means.

A data retrieval apparatus of a third embodiment of the present invention further includes a command retrieval entry means for allowing the user to enter a user name data for identifying the name of the user and a command identification data for identifying the data retrieval command, a command storage means for storing the data retrieval command generated by the retrieval command generation means in association with the user name data and the command identification data, a command retrieval means for reading the data retrieval command from the command storage means according to the user name data and the command identification data, and a command reuse means for when the data retrieval command is found, transmitting the data retrieval command to the retrieval execution means and when the data retrieval command is not found, actuating the dialogue means for amendment.

A data retrieval apparatus of a fourth embodiment of the present invention further includes a reuse command display means for displaying the data retrieval command which is found by the command retrieval means, a reuse edit command entry means for allowing the user to enter an edit command for modifying the data retrieval command displayed, and a reuse modification means for modifying the data retrieval command according to the user edit command and transmitting its modified version to the retrieval execution means, in which the command reuse means is replaced with an editable reuse means for when the data retrieval command is found by the command retrieval means, actuating the reuse edit command entry means for entry of the edit data and when the data retrieval command is not found, actuating the dialogue means for amendment.

According to the first embodiment of the present invention, the inference rules are constructed which can approximate the subjective criteria of the user, the data retrieval command is generated from the inference rules, and the data retrieval command is executed. In relation to the inference rules which designate a space, a range of the input is determined by the input range calculating means as a subspace in the space where a input data which produces an output greater than a predetermined value exists, while the space is defined by a region where a sum of the consequents of the inference rules is greater than the predetermined value. Hence, a logical operator, such as a logical sum or product, which is capable of connecting a plurality of statements or assertions representing (e.g. the ordering relationship can be used to aggregate the retrieval conditions for producing the data retrieval command). Therefore, the user can examine where the data retrieval command is based on the user subjective criteria or requirements.

Also, the data storage means is adapted for dividing data into a plurality of classes of attributes and storing the classes of the attributes as data sets, whereby the retrieval of a desired data set will be possible. As the result, the efficiency of the data retrieval action will be increased.

According to the second embodiment of the present invention, the data retrieval command is displayed before starting the action of data retrieval and can easily be modified by the user through entering a desired edit command. The data retrieval command is expressed by a collection of retrieval conditions aggregated using a logical operator, such as a logical sum or product, which is capable of connecting a plurality of statements or assertions representing e.g. the ordering relationship and will thus be perceived by the user without difficulty. When a condition representing false intention of the user exists, it will easily be found. Such unwanted conditions can be modified to an appropriate data retrieval command form by entry of the edit command, thus being prevented from a fault data retrieval.

According to the third embodiment of the present invention, any data retrieval command produced according to the subjective criteria or requirements of the user can be stored for reuse. The data retrieval command can be utilized whenever the same user requirements are involved. Hence, when the same user requirements are presented for data retrieval, it is unnecessary to repeat the generation of the data retrieval command.

According to the fourth embodiment of the present invention, the user can call for and modify a desired data retrieval command to be reused. When the subjective criteria of the user are varied after a long interval of time, the data retrieval command can be read out and modified to correspond to the varied requirements for reuse.

DETAILED DESCRIPTION OF THE INVENTION

The first embodiment of the present invention will be described referring to the accompanying drawings.

Figure 1:
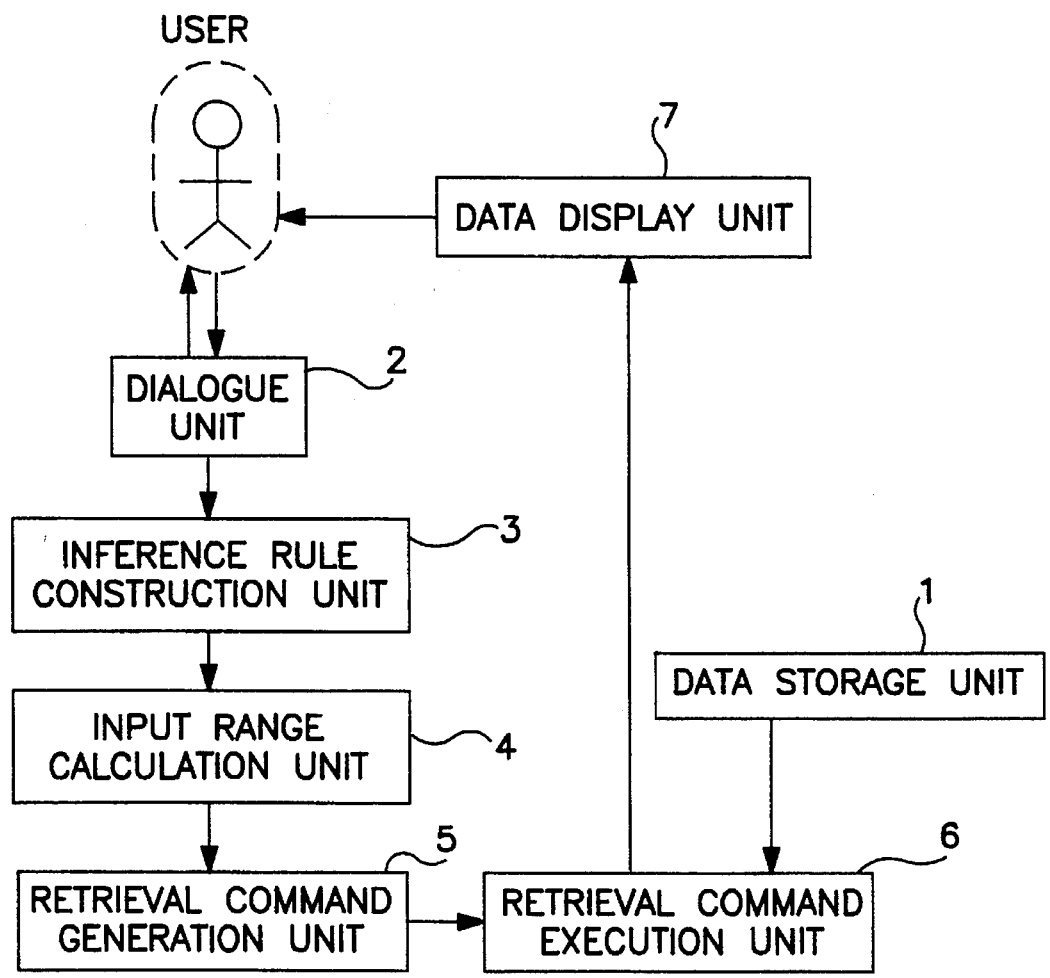
FIG. 1 is a block diagram of a data retrieval apparatus showing a first embodiment of the present invention.

FIG. 1 illustrates a block diagram of a data retrieval apparatus showing the first embodiment of the present invention. As shown in FIG. 1, there are provided a data storage unit 1 for storing data, a dialogue unit 2 for displaying at least one of the data and allowing the entry of a user evaluation data in response to the displayed data, an inference rule construction unit 3 for generating inference rules to approximate the input-output relation between the display data designated as an input and the user evaluation data designated as an output, an input range calculation unit 4 for calculating an input range under the inference rules to produce an output which satisfies given requirements, a retrieval command generation unit 5 for generating a command signal for retrieving a plurality of data in the input range, a retrieval execution unit 6 for executing a retrieval of the data from the data storage unit 1 in response to the retrieval command signal, and a data display unit 7 for displaying a result of the retrieval.

The operation of the data retrieval apparatus will now be explained in conjunction with the flow chart of FIG. 2. (Step a0)

An index structure is produced in which each of the attributes of a data stored the data storage unit 1 is classified into subgroups of attribute values. This step may be executed only once even if the data retrieval apparatus is repeatedly used. In the first embodiment, the subgroup of each data attribute resides in the size of an attribute value. Particularly, the subgroups of a qualitative attribute consisting of a string of symbols or characters are aligned in alphabetical order. For example, Table 1 indicates a data of part-timer where its attributes include monthly payment (in ten thousand yen), number of holidays per year (days), job, and identifier (id). The identifier id is automatically assigned by the data retrieval apparatus for identification of the data and is not included in the data.

TABLE 1

| id | payment | holidays | job |
|---|---|---|---|
| 1 | 10 | 20 | secretary |
| 2 | 25 | 18 | salesman |
| 3 | 35 | 8 | salesman |
| 4 | 43 | 9 | secretary |
| 5 | 35 | 18 | driver |
| 6 | 20 | 20 | salesman |
| 7 | 29 | 15 | driver |
| 8 | 40 | 5 | driver |
| 9 | 37 | 7 | secretary |
| 10 | 18 | 10 | driver |
| ⋮ | ⋮ | ⋮ | ⋮ |

Figure 3:
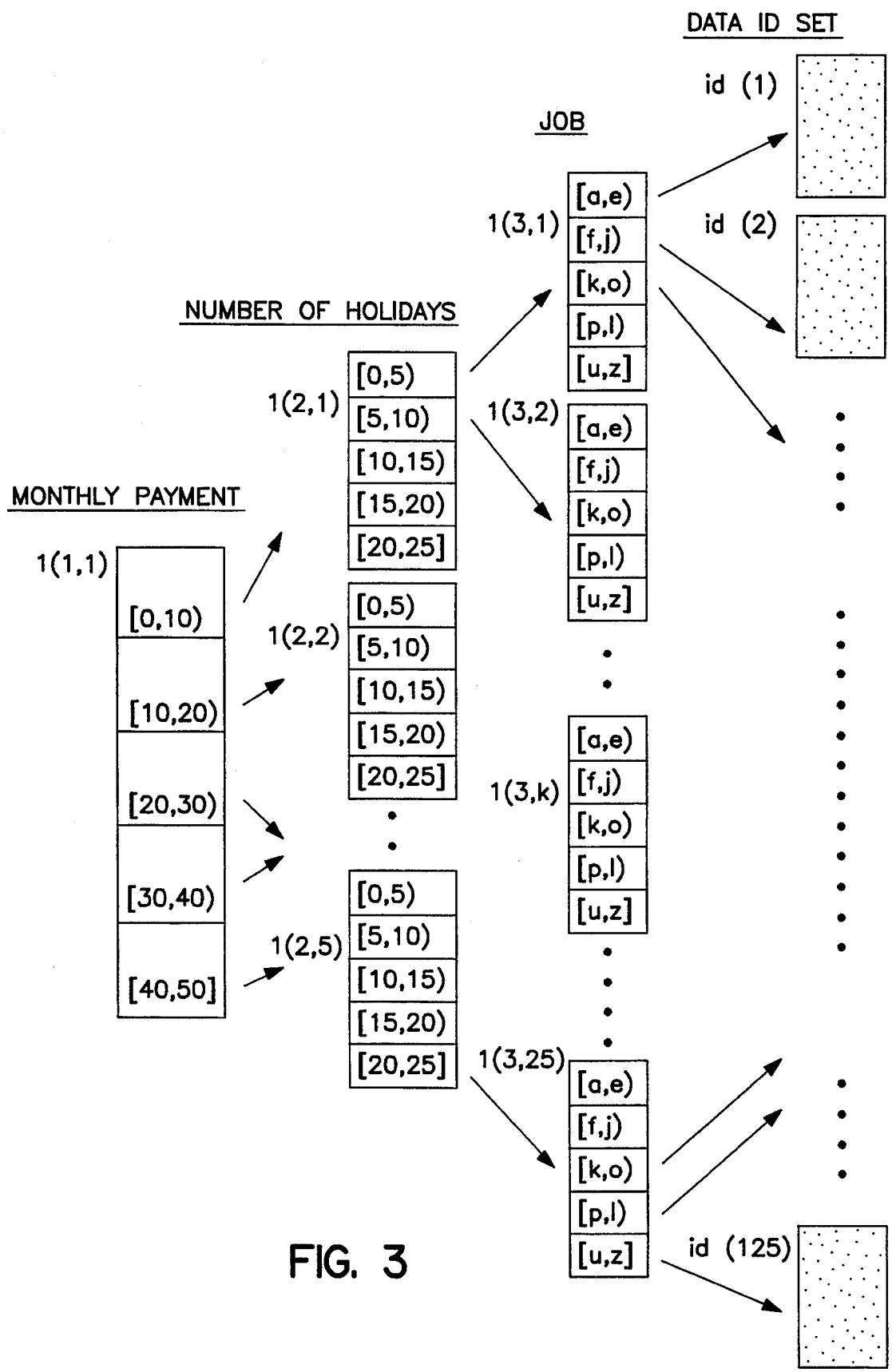
FIG. 3 is a diagram of an index structure employed in the first embodiment.

It is now assumed, for example, that the attribute consists of five different subgroups of attribute values excluding the identifiers id and thus, a resultant index structure I is constructed as shown in FIG. 3. The index structure I of FIG. 3 has a hierarchical arrangement; the payment subgroup I (1,1) is linked to the holiday subgroups I (2,1) to I (2,5) and the job subgroups I(3,1) to I(3,25). The item [X,Y) in the index structure I means that the attribute value belongs to a half-open interval including one endpoint X and excluding the other Y as assigned in the order of size for the quantitative attribute and in the alphabetical order for the qualitative attribute. If the attribute value is between X and Y, it belongs to [X,Y].

In indexing with the index structure I of FIG. 3, while each data of the database of Table I is identified by its identifier id (and referred to as data id), the attribute values of the respective attributes of the data id are tested in an order of the payment, the number of holidays, and the job. More specifically, the indexing of the data id moves along the links (as indicated by the arrow marks) until it reaches a data set (the set of the data id is referred to as a data id set). The data id set is joined by one of the data identifiers id(1) to id (125) for identification. The data identified by the data identifier id(n) is then examined whether it satisfies the requirements or not and if yes, it will be picked up as the retrieval result.

It is now assumed a retrieval of data with the use of the index structure I of FIG. 3 on condition that the payment is 450,000 yen or more, the number of holidays is not less than 18 days, and the job is secretary. As for the payment index I (1,1), 450,000 yen belongs to the fifth item [40,50]. The index I(2,5) for holidays is then examined, which is linked with the item [40,50]. At the index I(2,5), 18 days or more belongs to either the fourth item [15,20] and the fifth [20,25]. Then, two indices I(3,24) and I(3,25) which are linked to their respective items [15,20) and [20,25] are examined respectively to find a subgroup which contains the attribute value of secretary. The attribute value, secretary belongs to the item [p,t). Hence, the data id sets id(119) and id(124) are finally acquired. Then, the data contained in the data id sets id(119) and id(124) are retrieved from the database using the identifiers id. The attributes of the data defined by the identifiers id are compared with the retrieval conditions. From the comparison, the data of which attributes satisfy the retrieval conditions is selected and retrieved. As understood, the index structure I permits the attributes of a specific data contained in the data id set to be compared with the retrieval conditions. Accordingly, the retrieval action of the first embodiment will be fast as compared with the conventional manner where the attributes of all data have to be compared with the retrieval conditions.

The index structure of the first embodiment is not limited to the hierarchical type but may be carried out in another appropriate fashion with equal success. Also, other data retrieval accelerating techniques, e.g. Hashing or B-tree used in a traditional database management system, will be utilized for increasing the efficiency of retrieval action.

(Step a1)

The dialogue unit 2 displays relevant data stored in the apparatus as samples and allows the user to enter user evaluation data. The user evaluation data represents a human concept of personal requirement such as "appropriate" or "convenient" and is entered in the form of a value labeled in the interval [0,1] according to the embodiment. More specifically, the evaluation data is determined by the user to instruct data retrieval conditions. For example, if the user intends to retrieve "appropriate job" from the database of Table 1, he enters its corresponding data labeled in [0,1] in response to the displayed samples (including the attributes of amount of payment, number of holidays, and job). At this step, the entry data of the user is examined and if it is not labeled in [0,1], the user is informed of refusal of the entry data and required to enter a suitable form of data.

(Step a2)

The user evaluation data entered by the user at Step a1 is fed to the inference rule construction unit 3 where it is treated as the output data while the samples are regarded as the input data. The attribute of the data is normalized in [0,1] referring to the quantitative attributes. An example of the evaluation data corresponding to the samples is shown in Table 2.

TABLE 2

| payment | holidays | job | rating |
|---------|----------|----------|--------|
| 10, | 20, | secretary | 0.8 |
| 15, | 10, | secretary | 0.5 |
| 30, | 25, | driver | 0.7 |
| 40, | 15, | driver | 0.6 |
| : | : | : | : |
| : | : | : | : |

As shown, the quantitative attributes are the amount of payment and the number of holidays. If the payment is 50 at the maximum, it is normalized through dividing by 50. Similarly, if the number of holidays is 25 at the maximum, it is normalized by dividing by 25. As the result, input-output relations are established as shown in Table 3 where the evaluation data is treated as the output and the attribute: samples (amount of payment, number of holidays, and job) are regarded as the input.

TABLE 3

| payment | holidays | job | rating |
|---------|----------|----------|--------|
| 0.2, | 0.8, | secretary | 0.8 |
| 0.3, | 0.4, | secretary | 0.5 |
| 0.6, | 1.0, | driver | 0.7 |
| 0.8, | 0.6, | driver | 0.6 |
| : | : | : | : |
| : | : | : | : |

(Step a3)

The inference rule construction unit 3 generates an inference rule to approximate the input-output relation, shown in Table 3, between the input data and the output data transferred from Step a2. The construction of the inference rules is executed by an automatic rule construction method such as depicted in "Handling of Qualitative Attributes in Automatic Construction of Fuzzy Inference Rules by using Input-Output Data", Proceedings FD-7-3 of the 8th Fuzzy System Symposium, 1992. The automatic construction method automatically generates appropriate inference rules for approximating the input-output relation from an input and a data which contain qualitative attributes denoted by a string of symbols or characters such as a verbal noun and quantitative attributes represented by numerals.

Figure 4:
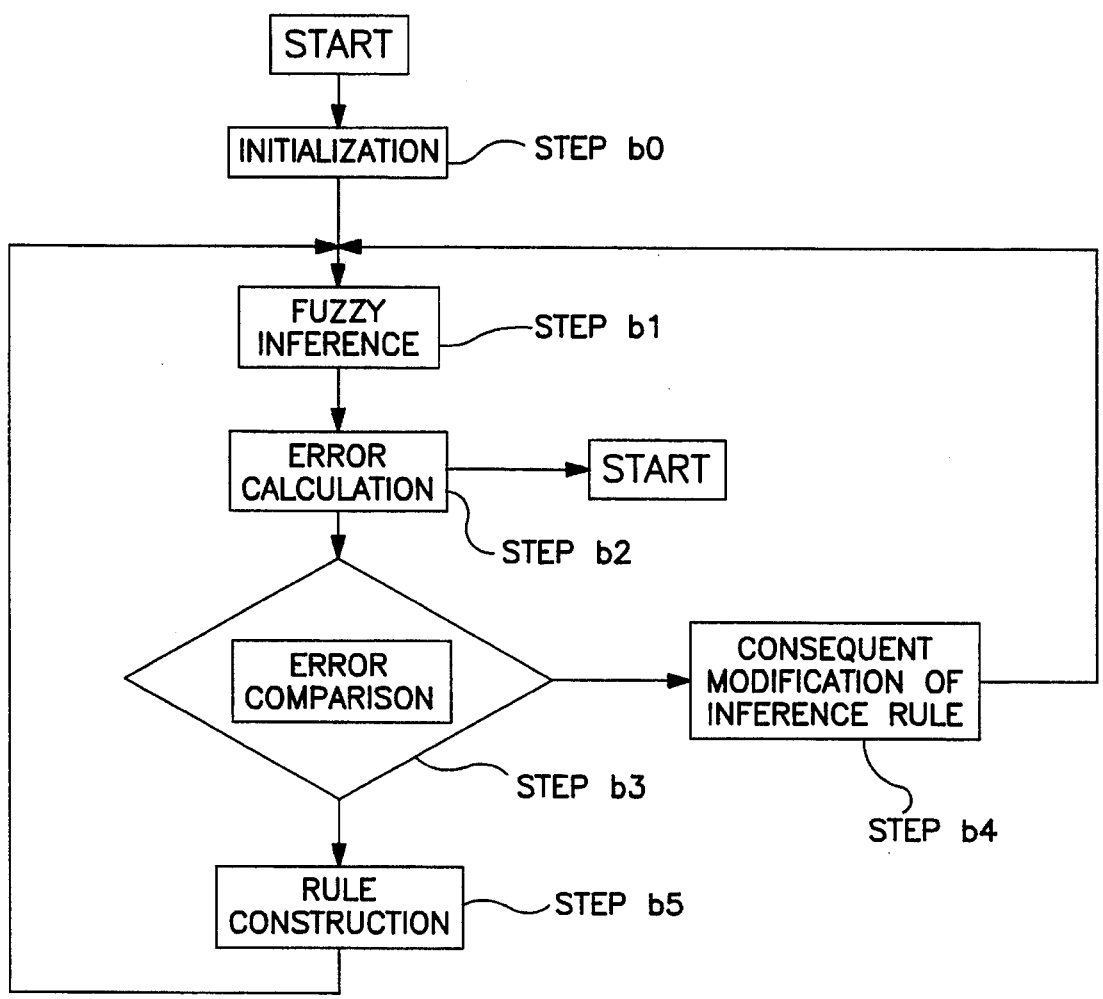
FIG. 4 is a flow chart of a procedure for automatically constructing an inference rule according to the first embodiment.

The inference rule has an antecedent consisting of membership functions and logical statements and a consequent consisting of real values. The procedure of the automatic inference rule construction is illustrated in FIG. 4. The procedure will now be explained in a sequence of steps.

At Step b0, a given number of the inference rules are initialized. Using the inference rules, inference from the input data is executed at Step b1. The inference result generated at Step b1 is compared with each output data to produce a reference error at Step b2. Then, when the inference error for each input-output relation is smaller than a predetermined value, the procedure is halted. The inference errors are stored for reuse and if Step b2 is repeated, the inference error is subtracted from a newly calculated inference error to determine a change. The change of inference error is arranged to forward the procedure from Step b3 to Step b4 only after the initial action of Step b2. At Step b3, the inference error change is compared with a setting value and if the change is greater than the setting, it is judged that the inference error is reduced by the action of Step b4 and the procedure moves to Step b4. If the change is smaller, the procedure goes to Step b5. At Step b4, the inference error will be decreased by varying a value of the consequent without changing the number of the inference rules. In this procedure, changing the consequent is implemented by e.g. a method of steepest descent or a quasi-Newton theorem.

At Step b5, new membership functions and the logical statements are generated. Then, a first inference rule having the membership functions in the antecedent and a second inference rule having the logical statements in the antecedent are constructed. The inference error is decreased by selecting at least one of the two, first and second, inference rules and adding it as an extra inference rule. More particularly, the new membership functions and the logical statements are generated so that the degree of membership can increase and statement can become true for the input data having a large inference error. The first and second inference rules which contain in the antecedent the membership functions and the logical statements respectively are thus constructed separately.. Accordingly, the inference error on each input data carl considerably be decreased by varying the values of the consequent of the inference rule. The automatic inference rule construction method ensures the automatic construction of an appropriate inference rule, which can approximate the input-output relation with precision, by varying its consequent during the dynamic rule construction according to the input and output data.

The inference rules constructed by the automatic inference rule construction method are expressed by Equation (3).

R1: IF X1=A([$L_{11}$,$M_{11}$,$H_{11}$]) and X2=A([$L_{12}$,$M_{12}$,$H_{12}$]) and...
and Xq=A([$L_{1q}$,$M_{1q}$,$H_{1q}$]) and $B_1$ then Y=w1
R2: IF X1=A([$L_{21}$,$M_{21}$,$H_{21}$]) and X2=A([$L_{22}$,$M_{22}$,$H_{22}$]) and...
and Xq=A([$L_{2q}$,$M_{2q}$,$H_{2q}$]) and $B_2$ then Y=w2

. . . . . . .

Rk: IF X1=A([$L_{k1}$,$M_{k1}$,$H_{k1}$]) and X2=A([$L_{k2}$,$M_{k2}$,$H_{k2}$]) and...
and Xq=A([$L_{kq}$,$M_{kq}$,$H_{kq}$]) and $B_k$ then Y=wk

. . . . . . .

In the inference rules of Equation (3), X1, X2, . . . , Xq are input data which contain quantitative attributes. Also, $$B_k(x_{q+1}, x_{q+2}, \ldots, x_m) =$$

B1, B2, . . . . , Bk are for input data ($X_{q+1}$, $X_{q+2}$, . . . , Xm) which contain qualitative attributes and more specifically, each is a logic set expressed by Bk($X_{q+1}$, $X_{q+2}$, . . . , Xm). In this embodiment, a front half of the input data is composed of the quantitative attributes as shown in Equation (3) . Thus, Rk(k=1, 2, . . . , n) represents the k-th inference rule. Xj=A([Lij, Mij, Hij]) is a membership function for the j-th quantitative attribute of the i-th rule and wk is a real value representing the consequent of the k-th rule. Bk is a set of logical statements for the quantitative attribute. In particular, Mij of the membership function Xj=A([nij, Mij, Hij]) is referred to as a center value hereinafter. The attribute of the input data is expressed by a capital letter, e.g. Xj and the value of the attribute is expressed by a small letter, e.g. xj.

The membership .function Xj=A ([T,ij, Mij, Hij]) (i=1, 2,..., n; j=1, 2, . . . , q) is defined as shown in Equation (4) . For matching with other statements, the membership function is denoted as Xj=A([Lij, Mij, Hij]) in the rule and as A ([Lij, Mij, Hij ]) (Xj) in the equation.

$$A([L_{ij}, M_{ij}, H_{ij}])(x_i) = \begin{cases} \frac{x_j - L_{ij}}{M_{ij} - L_{ij}} & ; L_{ij} \leq x_j \leq M_{ij} \\ \frac{H_{ij} - x_j}{H_{ij} - M_{ij}} & ; M_{ij} \leq x_j \leq H_{ij} \\ 0 & ; x_j < L_{ij}, x_j > H_{ij} \end{cases} \quad (4)$$

Equation (4) indicates the degree of membership of the membership function when the value of the j-th quantitative attribute is xJ. As shown, when the input range of each quantitative attribute is Mij≠0 and Mij≠1, the inference rules also include two different forms of the membership function Xj=A ( [T,ij, Mij, Hij]): Xj=A([Mij, Mkj, HkJ]) at T,kj=Mij and XJ=A([T,hj, Mhj, Mij]) at Hhj=Mij. The membership function of the s-th rule at Msj=0 produces Lsj=Msj and at Mfj=1, produces Mfj=Hfj.

The logic set Bk is always true when the qualitative attribute has a specific qualitative value. For example, logical statement which is true when the qualitative attribute Xj is equal to a qualitative value denoted by symbol is expressed a Xj=symbol. The logic set consists of elements connected to one another by logic products. The matching degree of the logic set Bk(xq+1, xq+2, . . . ,xm) is calculated from Equation (5), where the input data is (x1, X2, . . . ,xn). If Bk is empty, the antecedent of the inference rule carries no qualitative attribute condition and the matching degree of the qualitative attribute is 1.

$$\begin{cases} 1: [X_{q+1} = x_{q+1}, X_{q+2} = x_{q+2}, \ldots, X_m = x_m] \cup B_k \vdash \square \\ 0: [X_{q+1} = x_{q+1}, X_{q+2} = x_{q+2}, \ldots, X_m = x_m] \cup B_k \vdash \square \end{cases} \quad (5)$$

where ⊢ is a sign of capability of verifying a first-order predicative logic, □ represents contradiction, and is a sign of incapability of verifying a first-order predicative logic.

The inference on the inference rules is an extension of the fuzzy inference process for use of the logical statements of the antecedent and is thus expressed by Equation (6). In Equation (6), the output y* is calculated by inferring the input data (x1, x2, . . . , $x_m$). The degree of membership and the matching degree of logical statement are combined as follows:

$$\mu_k = A([L_{k1}, M_{k1}, H_{k1}])(x_1) \cdot A([L_{k2}, M_{k2}, H_{k2}])(x_2) \cdot$$
$$, \ldots, \cdot A([L_{kq}, M_{kq}, H_{kq}])(x_q) \cdot$$
$$B_k(x_{q+1}, x_{q+2}, \ldots x_m)$$

$$y^* = \frac{\sum_{k=1}^{n} \mu_k \cdot w_k}{\sum_{K=1}^{n} \mu_k} \quad (6)$$

For example, the inference rules shown in Equation (7) are automatically constructed from the input and output data listed in Table 3. For matching with other statements, the conditions to the qualitative attributes in the rules are expressed by a conditional sentence but not a set of logical statements.

R1: IF X1=A([0,0,0.5]) and X2=A([0,0,0.5]) the Y=w1  (7)
R2: IF X1=A([0,0,0.5]) and X2=A([0,0.5,1]) and X3 ≠ driver then Y=w2
R3: IF X1=A([0,0,0.5]) and X2=A([0,0.5,1]) and X3 = driver then Y=w3
R4: IF X1=A([0,0,0.5]) and X2=A ([0.5,1,1]) and X3 ≠ driver then Y=w4
R5: IF X1=A([0,0,0.5]) and X2=A([0.5,1,1]) and X3 = driver then Y=w5
R6: IF X1=A([0,0.5,1]) and X2=A([0,0,0.5]) and X3 ≠ secretary then Y=w6
R7: IF X1=A([0,0.5,1]) and X2=A([0,0,0.5]) and X3 = secretary then Y=w7
R8: IF X1=A([0,0.5,1]) and X2=A([0,0.5,1]) and X3 ≠ secretary and X3 ≠ driver then Y=w8
R9: IF X1=A([0,0.5,1]) and X2=A([0,0.5,1]) and X3 = driver then Y=w9
R10: IF X1=A([0,0.5,1]) and X2=A([0,0.5,1]) and X3 = secretary then Y=w10
R11: IF X1=A([0,0.5,1]) and X2=A([0.5,1,1]) and X3 ≠ driver then Y=w11
R12: IF X1=A([0,0.5,1]) and X2=A([0.5,1,1]) and X3 = driver then Y=w12
R13: IF X1=A([0.5,1,1]) and X2=A([0,0,0.5]) and X3 ≠ secretary then Y=w13
R14: IF X1=A9{0.5,1,1]) and X2=A([0,0,0.5]) and X3 = secretary then Y=w14
R15: IF X1=A([0.5,1,1]) and X2=A([0,0.5,1]) and X3 ≠ secretary then Y=w15
R16: IF X1=A([0.5,1,1]) and X2=A([0,0.5,1]) and X3 = secretary then Y=w16
R17: IF X1=A([0.5,1,1]) and X2=A([o.5,1,1]) then Y=w17

(Step a4)

This step is to extract from the inference rules constructed in Step a3 all of subspaces determined by the fact that the sum of the consequence values of the inference rules constituting a topological space is more than or equal to a given value G (hence, the smallest subspace is referred to as an input objective space). The smallest subspace is ignited by a particular input. More specifically, the subspace is composed of quantitative values defined by the center values of their respective membership functions and qualitative values which satisfy the logical statements separately, provided that the degree of membership of each antecedent of the $2q$ inference rules is greater then 0.

For example, when the number q of quantitative attributes is 2 in Equation (3), $2^2=4$ of the inference rules will be ignited by a given input. When the input is (X1, X2, X3)=(0.2, 0.2, secretary), the inference rules are ignited (R1, R2, R7, R10). At the antecedent of the inference rules, [0,0.5] and [0,0.5] which are intervals defined by the center values of the membership functions correspond to the input data X1 and X2 and "secretary" which is a qualitative value satisfying the logical statements corresponds to the input data X3. Hence, the smallest subspace determined from the input (X1, X2, X3)= (0.2, 0.2, secretary) is expressed as $\{(x1, x2, x3)|0 \leq x1 \leq 0.5$ and $0 \leq x2 \leq 0.5$ and x3=secretary$\}$.

When w7+w10+w14+w1.6, w8+w11+w15+w17, w9+w12+w15+w17, and w10+w11+w16+w17 of the inference rule of Equation (7) are greater than a given value, the input objective spaces are defined by $\{(x1, x2, x3)0.5 \leq x1 \leq 1$ and $0 \leq x2 \leq 0.5$ and x3=secretary$\}$, $\{(x1, x2, x3)0.5 \leq x1 \leq 1$ and $0.5 \leq x2 \leq x1$ and x3≠secretary and x3=driver$\}$, $\{(x1, x2, x3)0.5 \leq x1 \leq 1$ and $0.5 \leq x2 \leq 1$ and x3=driver$\}$, amd $\{(x1, x2, x3)0.5 \leq x1 \leq 1$ and $0.5 \leq x2 \leq 1$ and x3=secretary$\}$.

(Step a5)

The input range calculation unit 4 calculates an input range associated with a value more than or equal to G from the input objective space determined at Step a4. If the consequents of the inference rules in the input objective space are greater than G, each input data in the input objective space will produce an output greater than G through the inference process using Equation (6). If some of the consequents of the inference rules in the input objective space are smaller than G, all the input data in the space are subjected to the generation at a given precision and then, to the inference process. After the inference process, the range where the input data of which results are more than or equal to G exist is obtained. As the input-output relation examined by the inference rules is a continuous function, the input data of which results are more than or equal to G are not discrete but distributed in a range. For example, when the input objective space is $\{(x1, x2, x3)|0.5 \leq x1 \leq 1$ and $0 \leq x2 \leq 0.5$ and x3=secretary$\}$, the precision of 0.02 is assigned to X1, and the precision of 0.04 is assigned to X2, the input data are 338=26×13, 26 is the number of data, x1={0.5, 0.52, 0.54, 0.56, ..., 1.0} and 13 is the number of data, x2={0, 0.04, 0.08, 0.12, 0.16, ..., 0.5}. Accordingly, the range of the input data of which results are greater than the given value G is determined.

The calculation of the input range may be executed at a higher efficiency by dividing the input objective space by into two halves on each input variable.

(Step a6)

The input ranges calculated at Step a5 are now aggregated to designate retrieval conditions. The aggregation is carried out by joining input subspaces to a logic sum. For example, the input subspaces are $\{(x1, x2, x3)|0.5 \leq x1 \leq 1$ and $0.5 \leq x2 \leq 1$ and x3=driver$\}$ and $\{(x1, x2, x3)|0.5 \leq x1 \leq 1$ and $0.5 \leq x2 \leq 1$ and x3=secretary$\}$, the aggregation is expressed by $\{(x1, x2, x3)](0.5 \leq x1 \leq 1$ and $0.5 \leq x2 \leq 1$ and x3=secretary) or $(0.5 \leq x1 \leq 1$ and $0.5 \leq x2 \leq 1$ and x3=driver)$\}$.

The aggregation is not limited to a logic sum. For example, two subspaces $\{(x1, x2, x3)|0.5 \leq x1 \leq 1$ and $0 \leq x2 \leq 0.5$ and x3=secretary$\}$ and $\{(x1, x2, x3)|0.5 \leq 1 \leq 1$ and $0.5 \leq x2 \leq 1$ and x3=secretary$\}$ which are continuous for x2 are aggregated to form $\{(x1, x2, x3)|0.5x1 \leq 1$ and $0 \leq x2 \leq 1$ and x3=secretary$\}$. Through the aggregation process, the retrieval conditions will be made more understandable.

(Step a7)

The retrieval command generation unit 5 produces a retrieval command using the retrieval conditions determined at Step a6. The retrieval command in the embodiment is generated from the rule shown in (8).

SELECT attributes

WHERE the retrieval conditions  (8)

The retrieval conditions are a group of the input attribute values defined by equality and inequality statements. For producing the retrieval conditions, the input attributes are converted by a reverse of the procedure of Step a2 to unit data equal in the form to the stored data since the input range calculated at Step a6 has been normalized. For example, the input range determined at Step a6 is $\{(x1, x2, x3)|0.75 \leq x1 \leq 1$ and $0.4 \leq x2 \leq 0.5$ and x3=secretary) or $(0.5 \leq x1 \leq 1$ and $0.5 \leq x2 \leq 1)$}, the amount of monthly payment is multiplied by 50 and the number of holidays is multiplied by 25 by the reverse of the procedure of Step a2 to generate the data retrieval command shown in Equation (9).

$$\begin{aligned} &\text{SELECT amount of payment, number of holidays,} \\ &\text{and job} \\ &\quad \text{WHERE } (37.5 \leq \text{payment} \leq 50 \text{ and } 10 \leq \text{holidays} \leq 12.5 \text{ and job=secretary)} \\ &\quad \text{or } 25 \leq \text{payment} \leq 50 \text{ and } 12.5 \leq \text{holidays} \leq 25) \end{aligned} \quad (9)$$

(Step a8)

The retrieval execution unit 6 retrieves relevant data from the data storage unit 1 according to the data retrieval command generated at Step a7. The retrieval of the data is accompanied with the indexing explained in Step a0. For example, if the data retrieval command demands $(37.5 \leq \text{payment} \leq 50$ and $10 \leq \text{holidays} \leq 12.5$ and job=secretary), the data retrieval is subjected to the index I of FIG. 3. The index $I(1,1)$ is satisfied by the fourth and fifth items and the indexing is advanced in the directions of the arrow marks. The indices $I(2,4)$ and $I(2,5)$ are attributed to their third items. The third item is linked to the fourth items of the indices $I(3,18)$ and $I(3,23)$. Finally, the indexing from the fourth items reaches the data id sets $id(89)$ and $i(114)$. Then, the data contained in the data id sets $id(89)$, $id(114)$ are examined using the identifiers id whether they satisfy the retrieval conditions or not. If yes, the data will be retrieved.

(Step a9)

The data retrieved at Step a8 is displayed as the retrieval results.

As set forth above, according to the first embodiment of the present invention, the inference rules are constructed which can approximate the subjective criteria of the user at high precision, the data retrieval command is generated from the inference rules, and corresponding data are retrieved by the data retrieval command. The data retrieval command has an easily understandable form of the retrieval conditions using common equaity and inequality symbols and thus, the data retrieval can be executed at high efficiency with the use of a high-speed retrieving technique such as indexing of attributes of the data which are aligned in order of size in the storage.

Although the data to be displayed to the user at Step a1 are prepared in advance in the first embodiment, they may be read directly from the data storage unit 1.

A second embodiment of the present invention will be described referring to FIG. 5.

Figure 5:
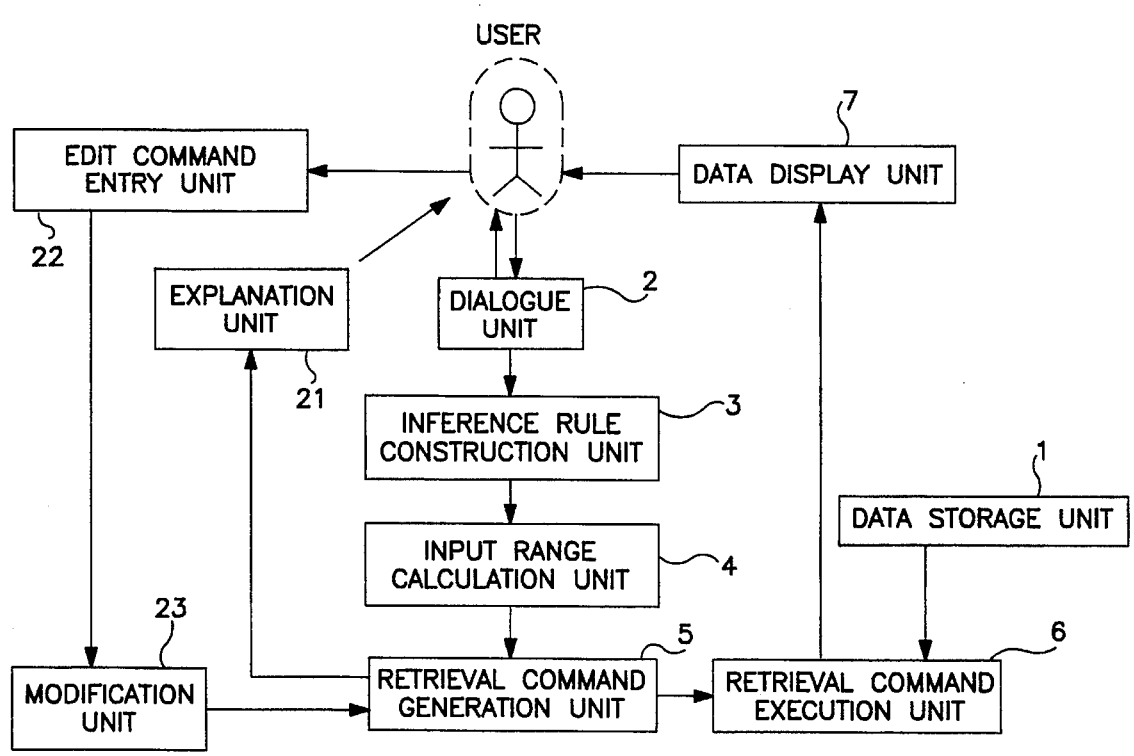
FIG. 5 is a block diagram of a data retrieval apparatus showing a second embodiment of the present invention.

The second embodiment of the present invention shown in FIG. 5 has an arrangement similar to that of the first embodiment, where like components are denoted by like numerals and will be no more explained. The second embodiment is distinguished from the first embodiment by the fact that there are additionally provided a explanation unit 21 for displaying the data retrieval command to the user, an edit command input unit 22 for entering a user command for editing the retrieval command, and a modification unit 23 for modifying the data retrieval command in response to the edit command.

Figure 6:
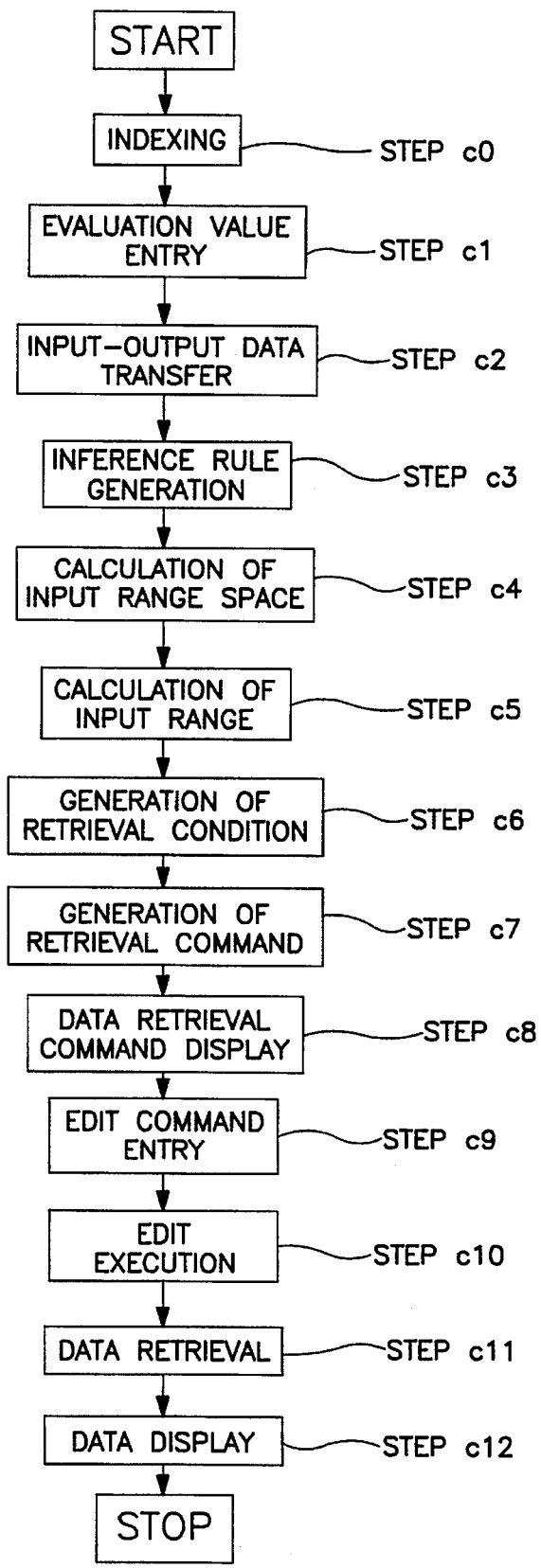
FIG. 6 is a flow chart of a retrieval operation according to the second embodiment.

The operation of the data retrieval apparatus of the second embodiment will be explained in conjunction with the flow chart of FIG. 6.

The procedure from Step c0 to c7 is substantially identical to Steps a0 to a7 of the first embodiment. The actions at Steps c11 and c12 are basically equal to those in Steps a8 and a9 of the first embodiment. Thus, the actions in the foregoing steps are no longer described and the other steps of the second embodiment will be explained in details.

(Step c8)

The data retrieval command is displayed at the explanation unit 21. The data retrieval command displayed in the easily understandable form using common equality and inequality symbols can be perceived with ease. It is assumed that the data retrieval command displayed is as shown in Equation (9).

(Step c9)

An edit command is entered through the edit command input unit 22 by the user after reviewing the data retrieval command. The entry of the edit command in the second embodiment is by means of Prolog, a programming language, in which the input consists of a command for deleting a particular condition of the retrieval conditions and a command for adding a desired condition to the retrieval conditions. The delete command is "delete (condition)" and the addition command is "add (condition, logical operator)". In the second embodiment, the logical operator is a logic product or logic sum. For example, if the retrieval conditions displayed are "$0 \leq \text{payment} \leq 50$ and $0 \leq \text{holidays} \leq 5$ and job=secretary" and the item job=secretary is a target to be deleted, the edit command is expressed by "delete job=secretary)".

(Step c10)

The modification unit 23 modifies the retrieval conditions according to the edit command given at Step c9. For example, if the edit command is "delete (job=secretary)" and "add ((job=driver or job=secretary), and)", the retrieval conditions are converted from "$0 \leq \text{payment} \leq 50$ and $0 \leq \text{holidays} \leq 5$ and job=secretary" to "$0 \leq \text{payment} \leq 50$ and $0 \leq \text{holidays} \leq 5$ and (job=driver or job=secretary)".

As set forth above, the data retrieval apparatus of the second embodiment is capable of displaying the data retrieval command thus allowing the user to examine if the retrieval conditions represent the user requirements. If the retrieval conditions fail to represent the user requirements, a desired modification to the conditions can easily be made by producing and entering a corresponding edit command.

A third embodiment of the present invention will be described referring to FIG. 7.

Figure 7:
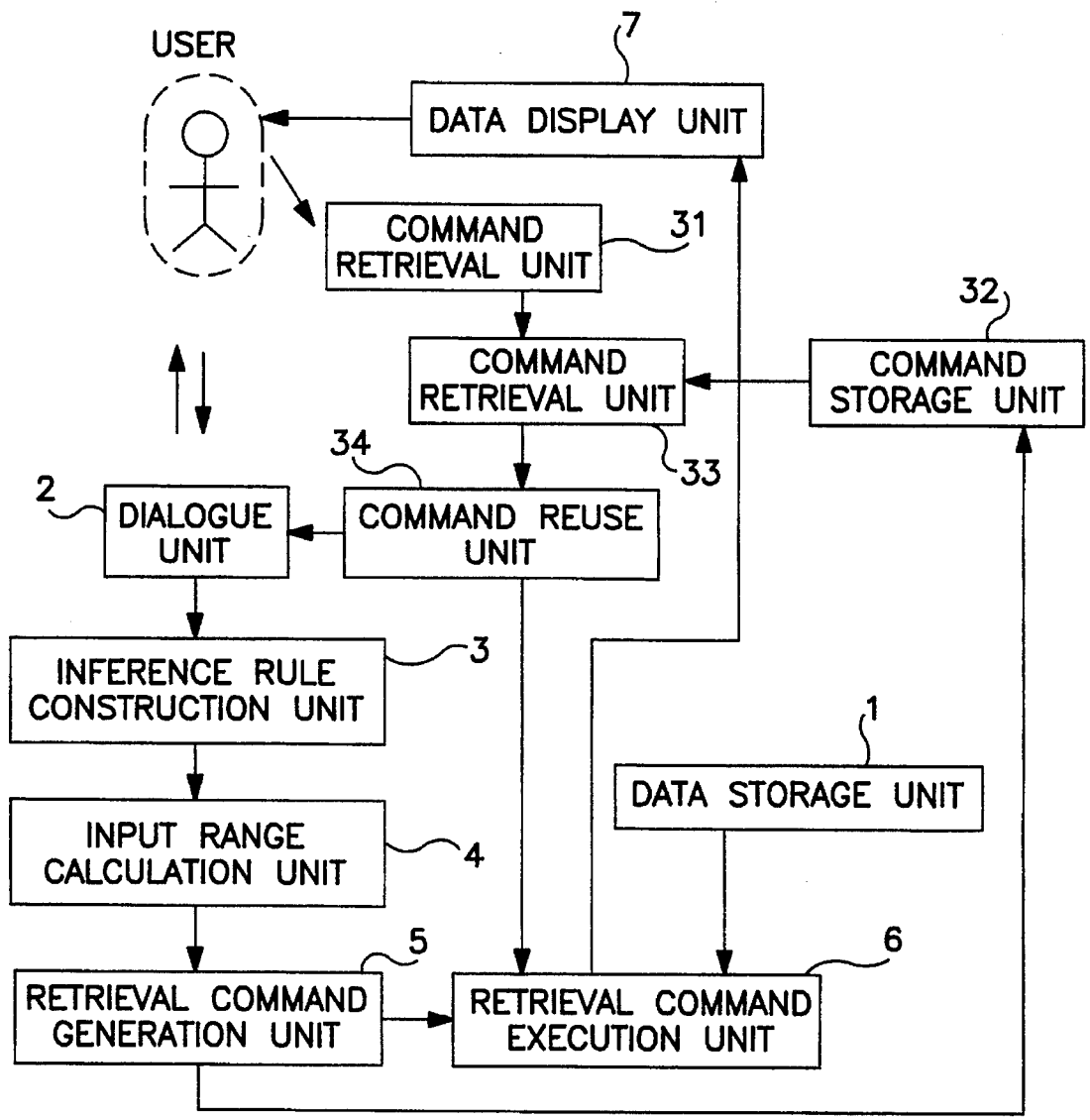
FIG. 7 is a block diagram of a data retrieval apparatus showing a third embodiment of the present invention.

A data retrieval apparatus of the third embodiment shown in FIG. 7 has a construction similar to that of the first embodiment., where like components are denoted by like numerals and will be no more explained. The third embodiment is distinguished from the first embodiment by the fact that there are additionally provided a command retrieval input unit 31 for entering a user name data and a command identification data for identifying a data retrieval command, a command storage unit 32 for storing the data retrieval commands produced by the retrieval command generation unit 5 in association with command names and user names, a command retrieval unit 33 for retrieving the data retrieval command identified by the command identification data and the user name data which have been entered through the command retrieval input unit: 31, and a command reuse unit 34 for if the data retrieval command is found, transmitting it to the retrieval execution unit 6 and if not, restarting the dialogue unit 2.

Figure 8:
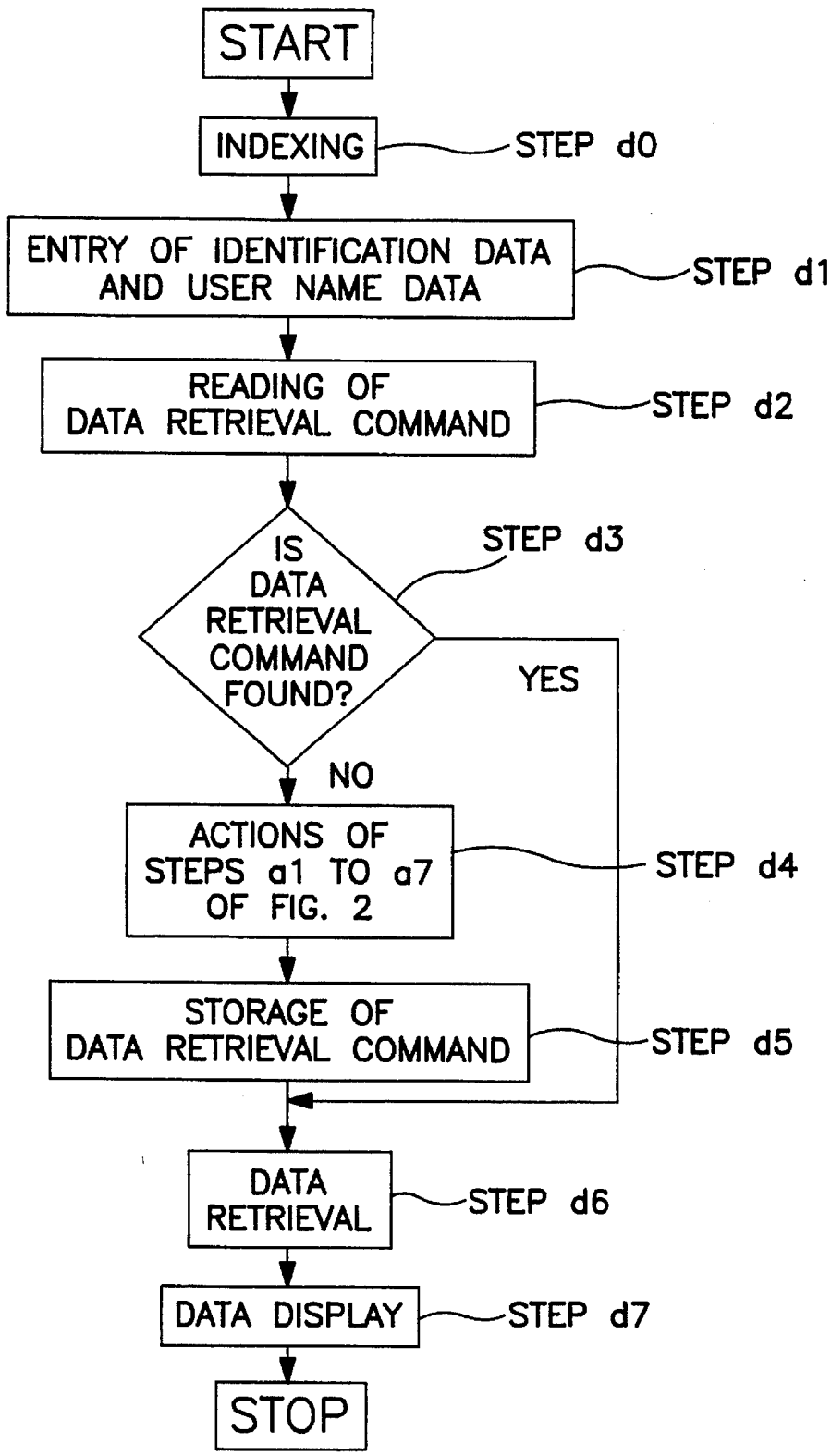
FIG. 8 is a flow chart of a retrieval operation according to the third embodiment.

The operation of the data retrieval apparatus of the third embodiment will now be explained referring to the flow chart of FIG. 8.

Figure 2:
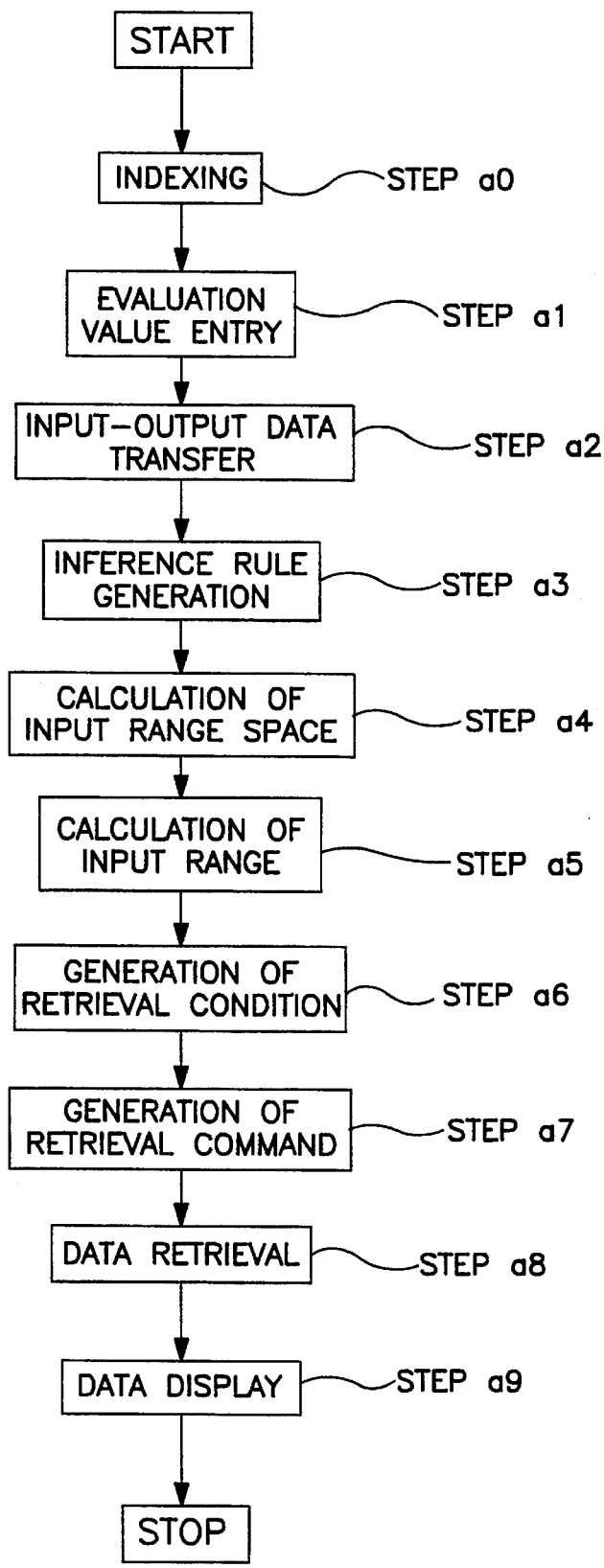
FIG. 2 is a flow chart of a retrieval operation according to the first embodiment.

The action at Step d0 is fundamentally equal to that of Step a0 of the first embodiment shown in FIG. 2. Step d4 operates the actions from Step a1 to Step a7 of the first embodiment. Similarly, the actions of Steps d6 and d7 are substantially identical to those of Steps a8 and a9. Hence, the actions of the other steps of the third embodiment only will be explained in details.

(Step d1)

The command retrieval input unit 31 allows the user to enter a desired user name data and a relevant command identification data for identifying the data retrieval command to be required. The user name data may be of any form, e.g. symbols or numerals, which is capable of identifying a wailted user name. The command identification data may be of a verbal instruction, e.g. "proper job" or "more payable job" if the stored data is as shown in Table 1, for ease of finding a desired data retrieval command for data retrieval from the storage.

(Step d2)

The data retrieval commands are accompanied with their identification names and user names and stored in the command storage unit 32, for example, as shown in Table 4.

TABLE 4

| Command Names | User Names | Data Retrieval Commands |
| --- | --- | --- |
| Proper job | Name 1 | SELECT Amount of payment, Number of holidays, job WHERE $30 \leq payment \leq 50$ and $10 \leq holidays \leq 15$ and job=secretary |
| Proper job | Name 2 | SELECT Amount of payment, Number of holidays, job WHERE $20 \leq payment \leq 50$ and $20 \leq holidays \leq 25$ and job=secretary |
| More payable job | Name 2 | SELECT Amount of payment, Number of holidays, job WHERE $40 \leq payment \leq 50$ and $0 \leq holidays \leq 5$ and job=secretary |

The command retrieval unit 33 retrieves a corresponding data retrieval command from the list of commands of Table 4 using the command identification data and the user name data given at Step d1.

(Step d3)

When the desired data retrieval command is found at Step d2, the procedure moves through the command reuse unit 34 to Step d6. If the desired command is not found at Step d2, the procedure goes to Step d4.

(Step d5)

A new data retrieval command generated at Step d4 is stored in the command storage unit 32 along with the user name data and the command identification data used at Step d1.

As set forth above, the data retrieval apparatus of the third embodiment of the present invention allows a desired data retrieval command to be produced and stored for reuse when it is demanded by the same user requirements. Accordingly, if the same user requirements are presented for data retrieval, their corresponding data retrieval command can be utilized without the need of generating a new command.

It would be understood that a combination of the command retrieval input unit 31, the command storage unit 32, the command retrieval unit 33, and the command reuse unit 34 of the third embodiment is applicable to the arrangement of the second embodiment with equal success.

A fourth embodiment of the present invention will be described referring to FIG. 9.

Figure 9:
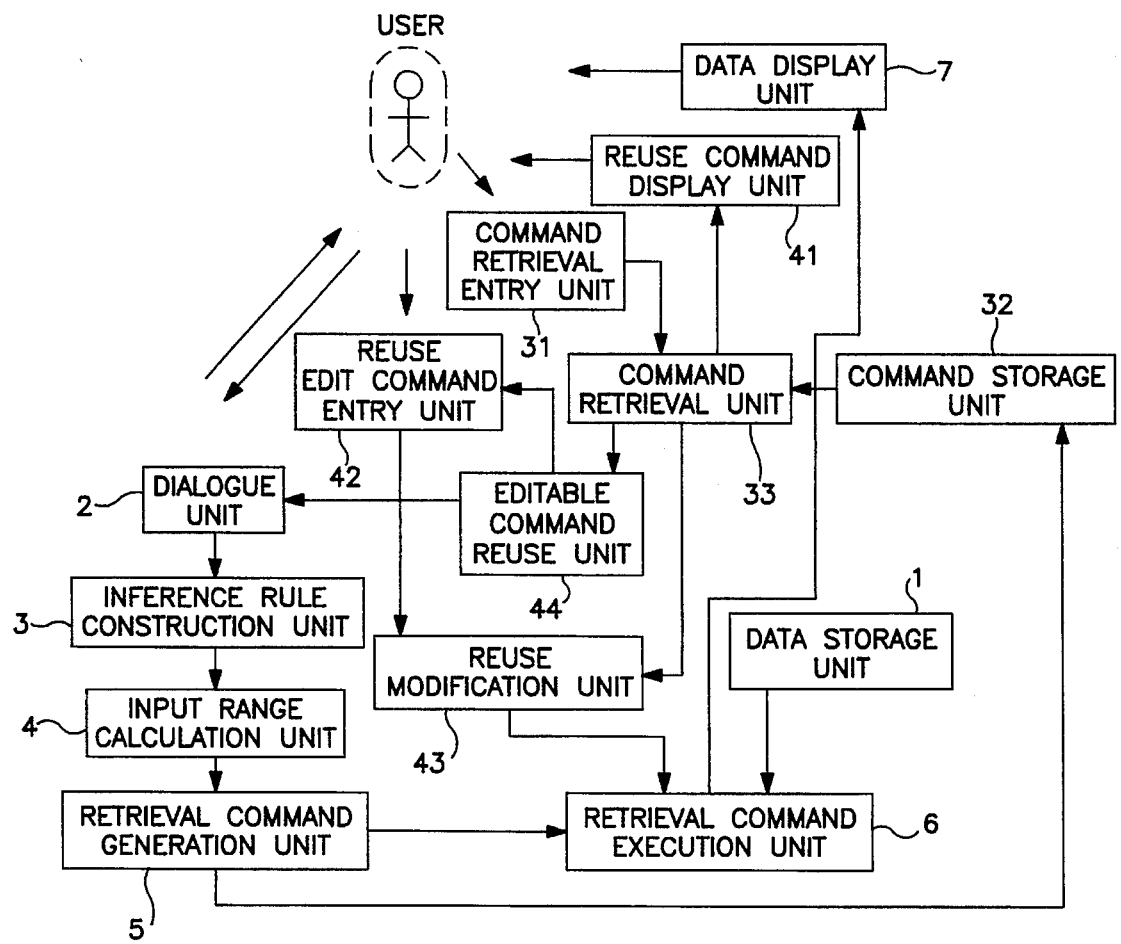
FIG. 9 is a block diagram of a data retrieval apparatus showing a fourth embodiment of the present invention.

The fourth embodiment of the present invention shown in FIG. 9 has an arrangement similar to that of the third embodiment of FIG. 7, where like components are denoted by like numerals and will be no more explained. The fourth embodiment is distinguished from the third embodiment by the facts that there are additionally provided a reuse command display unit 41 for displaying a data retrieval command retrieved by the command retrieval unit 33, a reuse edit command for input unit 42 for entering a user edit command for modifying the data retrieval command displayed, and a reuse modification unit 43 for modifying the data retrieval command according to the edit command and transmitting it to the retrieval execution unit 6, and that the command reuse unit 34 is replaced with an editable command reuse unit 44 for if the data retrieval command is not found in the command retrieval unit 33, actuating the dialogue unit 2 and if found, actuating the reuse edit command input unit 42.

Figure 10:
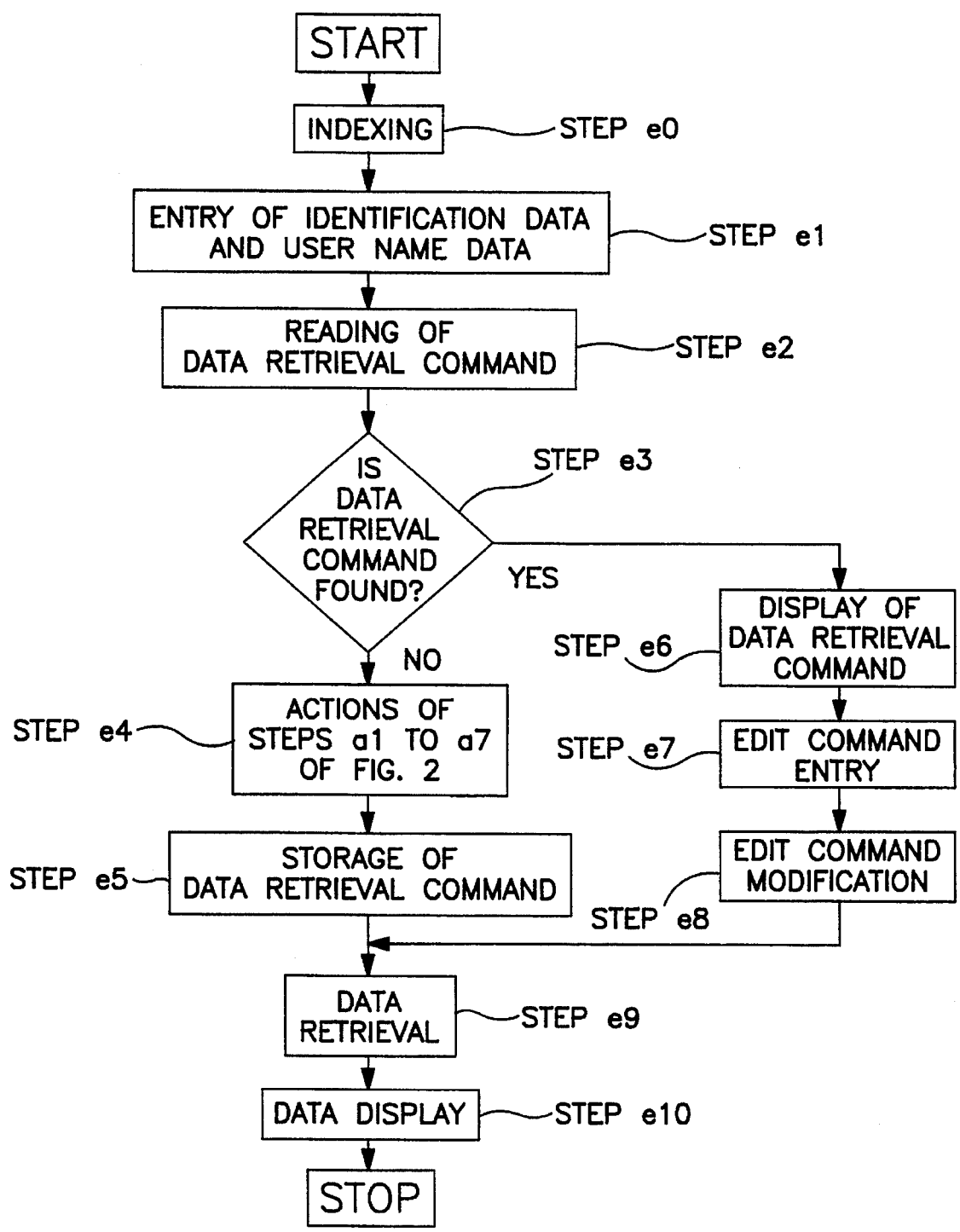
FIG. 10 is a flow chart of a retrieval operation according to the fourth embodiment.
Figure 11:
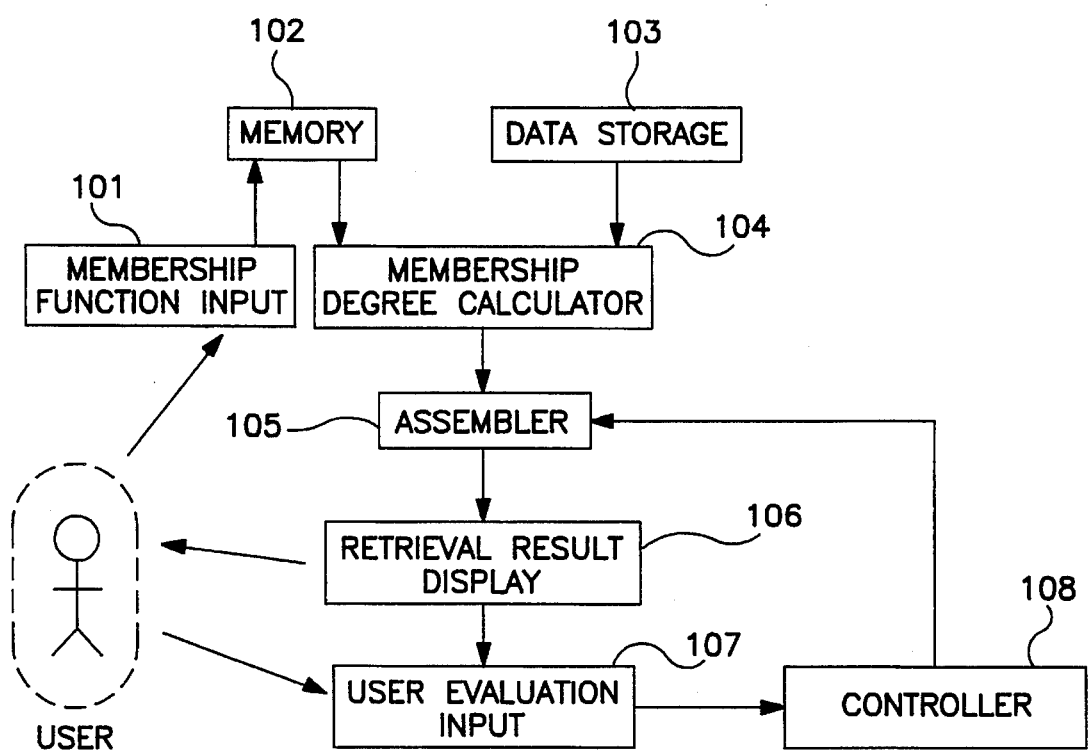
FIG. 11 is block diagram of a prior art data retrieval apparatus.

The operation of the data retrieval apparatus of the fourth embodiment will now be explained referring to the flow chart of FIG. 10.

The procedure from Step e0 to e2 is substantially identical to Steps d0 to d2 of the third embodiment. The actions at Steps e4 and e5 are basically equal to those in Steps d4 and d5 of the third embodiment. Similarly, the actions at Steps e9 and e10 are equivalent to those of Steps d6 and d7. Thus, the actions in the foregoing steps are no longer described and the other steps of the fourth embodiment only will be explained in details.

(Step e3)

When the data retrieval command is found at Step e2, the procedure goes to step e6 for use of the editable command reuse unit 44. If it is not found, the procedure moves to Step e4.

(Step e6)

The data retrieval command found at Step e2 is displayed on the reuse command display unit 41. The form of the data retrieval command is identical to that of the third embodiment and will easily be perceived.

(Step e7)

A desired edit command is entered by the user to the reuse edit command input unit 42. The edit command is also identical to that explained in Step c9 of the second embodiment. For example, if the retrieval conditions displayed are "$0 \leq payment \leq 50$ and $0 \leq holidays \leq 5$ and job=secretary"

and the condition job=secretary is a target to be deleted, the edit command is "delete (job=secretary)".

(Step e8)

The reuse modification unit 43 modifies the retrieval condition data of the data retrieval command according to the edit command given at Step e7.

As set forth above, the data retrieval apparatus of the fourth embodiment of the present invention allows the user to modify a wanted data retrieval command to be reused. When the user requirements are varied during reuse of the data retrieval command, the data retrieval command can be modified to correspond to the varied requirements. It should be understood that any modified version of the data retrieved command signal is storable in the command storage unit 32.

Each of the foregoing four embodiments may be realized by using a software system on a computer or a combination of hard circuits which perform respective functions corresponding to the abovementioned steps.

According to the first embodiment of the present invention, the inference rules are constructed which can approximate the subjective criteria of the user at high precision, the data retrieval command is generated from the inference rules, and corresponding data are retrieved by the data retrieval command. The data retrieval command is consisted of an easily understandable form of the retrieval conditions using common equality and inequality symbols and thus, the data retrieval can be executed at high efficiency with the use of a high-speed retrieving technique such as indexing of attributes of the data which are aligned in order of size in the storage.

According to the second embodiment of the present invention, the data retrieval apparatus displays a data retrieval command thus allowing the user to examine, before starting the action of data retrieval, if the retrieval conditions represent the user requirements. If the retrieval conditions fail to represent the user requirements, a desired modification to the conditions can easily be made by producing and entering a corresponding edit command.

According to the third embodiment of the present invention, any data retrieval command produced can be stored for reuse. The data retrieval command can be utilized whenever the same user requirements are involved. Accordingly, when the same user requirements are presented for data retrieval, it is unnecessary to repeat the generation of the data retrieval command.

According to the fourth embodiment of the present invention, the user can read and modify a desired data retrieval command to be reused. When the user requirements are varied during reuse of the data retrieval command, the data retrieval command can be modified to correspond to the varied requirements.

What is claimed is:

1. A data retrieval apparatus comprising:

data storage means for storing storage data;

dialogue means for displaying one data and allowing a user to enter an evaluation data corresponding to the displayed data;

inference rule construction means, coupled to the dialogue means, for generating inference rules which can approximate an input-output relation between the displayed data designated as an input and the user evaluation data designated as an output;

input range calculation means, coupled to the inference rule construction means, for calculating a range of the input to produce the output which satisfies given conditions under the inference rules generated by the inference rule construction means;

retrieval command generation means, coupled to the input range calculation means, for generating a data retrieval command according to the input range calculated by the input range calculation means;

retrieval execution means, coupled to the data storage means and the retrieval command generation means, for performing a retrieval of the storage data from the data storage means in response to the data retrieval command; and data display means, coupled to the retrieval execution means, for displaying the retrieval result of the retrieval execution means.

2. A data retrieval apparatus according to claim 1, wherein the data retrieval command is expressed by a collection of retrieval conditions aggregated using a logical operator, which is capable of connecting a plurality of statements representing a particular relationship.

3. The data retrieval apparatus according to claim 1, wherein said storage data has attribute values having respective attribute sizes and said input range calculation means calculates said range to utilize said attribute values and said sizing information to retrieve said storage data.

4. The data retrieval apparatus according to claim 1, wherein said storage data has attribute values having respective attribute sizes, said attribute values arranged according to an index in said data storage means, and said input range calculation means calculates said range to utilize said attribute values, said sizing information, and said index to retrieve said storage data from said data storage means.

5. A data retrieval apparatus comprising:

data storage means for dividing data into a plurality of classes of attributes and storing the classes of the attributes as data sets;

dialogue means for displaying one data and allowing a user to enter and evaluation data corresponding to the displayed data;

inference rule construction means, coupled to the dialogue means, for generating an inference rule which can approximate an input-output relation between the displayed data designated as an input and the user evaluation data designated as an output;

input range calculation means, coupled to the inference rule construction means, for calculating a range of the input to produce the output which satisfies given conditions under the inference rules generated by the inference rule construction means;

retrieval command generation means, coupled to the input range calculation means, for generating a data retrieval command according the to input range calculated by the input range calculation means;

retrieval execution means, coupled to the retrieval command generation means and the data storage means, for selecting a relevant data set from the data sets in response to the data retrieval command and performing a retrieval of said storage data from the data storage means according to the data set; and data display means, coupled to the retrieval execution means, for displaying the retrieval result of the retrieval execution means.

6. A data retrieval apparatus according to claim 5, wherein the data retrieval command is expressed by a collection of retrieval conditions aggregated using a logical operator which is capable of connecting a plurality of statements representing a particular relationship.

7. A data retrieval apparatus comprising:

data storage means for storing storage data;

dialogue means for displaying one data and allowing a user to enter an evaluation data corresponding to the displayed data;

inference rule construction means, coupled to the dialogue means, for generating inference rules which can approximate an input-output relation between the displayed data designated as an input and the user evaluation data designated as an output wherein each inference rule has a consequent;

input range calculation means, coupled to the inference rule construction means, for calculating, under the inference rules generated by the inference rule construction means, a range of the input which is a subspace wherein an input data which produces an output of greater than a predetermined value exists, the subspace defined by a region of a space where a sum of the consequents of the inference rules is greater than the predetermined value;

retrieval command generation means, coupled to the input range calculation means, for generating a data retrieval command according to the input range calculated by the input range calculation means;

retrieval execution means, coupled to the retrieval command generation means and the data storage means, for performing a retrieval of the storage data from the data storage means in response to the data retrieval command; and data display means, coupled to the retrieval execution means, for displaying the retrieval result of the retrieval execution means.

8. A data retrieval apparatus according to claim 7, wherein the data retrieval command is expressed by a collection of retrieval conditions aggregated using a logical operator which is capable of connecting a plurality of statements representing a particular relationship.

9. A data retrieval apparatus comprising data storage means for storing storage data;

dialogue means for displaying one data and allowing a user to enter an evaluation data corresponding to the displayed data;

inference rule construction means, coupled to the dialogue means, for generating inference rules which can approximate an input-output relation between the displayed data designated as an input and the user evaluation data designated as an output;

input range calculation means, coupled to the inference rule construction means, for calculating a range of inputs to produce outputs which satisfies given conditions under the inference rules generated by the inference rule construction means;

retrieval command generation means, coupled to the input range calculation means, for generating a data retrieval command according to the input range calculated by the input range calculation means;

retrieval execution means, coupled to the retrieval command generation means and the data storage means, for performing a retrieval of the storage data from the data storage means in response to the data retrieval command;

data display means, coupled to the retrieval execution means, for displaying the retrieval result of the retrieval execution means;

explanation means, coupled to the retrieval command generation means, for displaying the data retrieval command generated by the retrieval command generation means; and modification means, coupled to the explanation means, for allowing the user to modify the data retrieval command displayed on the explanation means.

10. A data retrieval apparatus according to claim 9, wherein the data retrieval command is expressed by a collection of retrieval conditions aggregated using a logical operator which is capable of connecting a plurality of statements representing a particular relationship.

11. A data retrieval apparatus comprising:

data storage means for storing storage data;

dialogue means for displaying one data and allowing a user to enter an evaluation data corresponding to the displayed data;

inference rule construction means, coupled to the dialogue means, for generating inference rules which can approximate an input-output relation between the displayed data designated as an input and the user evaluation data designated as an output;

input range calculation means, coupled to the inference rule construction means, for calculating a range of inputs to produce outputs which satisfies given conditions under the inference rules generated by the inference rule construction means;

retrieval command generation means, coupled to the input range calculation means, for generating a data retrieval command according to the input range calculated by the input range calculation means;

retrieval execution means, coupled to the retrieval command generation means and the data storage means, for performing a retrieval of the storage data from the data storage means in response to the data retrieval command;

data display means, coupled to the retrieval execution means, for displaying the retrieval result of the retrieval execution means;

command retrieval-entry means for allowing the user to enter a user name delta for identifying the name of the user and a command identification data for identifying the data retrieval command;

command storage means, coupled to the retrieval command generation means and the command retrieval entry means, for storing the data retrieval command generated by the retrieval command generation means in association with the user name data and the command identification data;

command retrieval means, coupled to the command storage means, for reading the data retrieval command from the command storage means according to the user name data and the command identification data; and command reuse means, coupled to the command retrieval means, for, when the data retrieval command is found, transmitting the data retrieval command to the retrieval execution means and, when the data retrieval command is not found, actuating the dialogue means for amendment.

12. A data retrieval apparatus according to claim 11, wherein the data retrieval command is expressed by a collection of retrieval conditions aggregated using a logical operator which is capable of connecting a plurality of statements representing a particular relationship.

13. A data retrieval apparatus comprising;

data storage means for storing storage data;

dialogue means for displaying one data and allowing a user to enter an evaluation data corresponding to the displayed data;

inference rule construction means, coupled to the dialogue means, for generating an inference rule which can approximate the input-output relation between the displayed data designated as an input and the user evaluation data designated as an output;

input range calculation means, coupled to the inference rule construction means, for calculating a range of the input to produce the output which satisfies given conditions under the inference rules constructed by the inference rule construction means;

retrieval command generation means, coupled to the input range calculation means, for generating a data retrieval command according to the input range calculated by the input range calculation means;

retrieval execution means, coupled to the retrieval command generation means and the data storage means, for performing a retrieval of said storage data from the data storage means in response to the data retrieval command;

data display means, coupled to the retrieval execution means, for displaying the retrieval result of the retrieval execution means;

command retrieval entry means for allowing the user to enter a user name delta for identifying the name of the user and a command identification data for identifying the data retrieval command;

command storage means, coupled to the retrieval command generation means and the command retrieval entry means, for storing the data retrieval command generated by the retrieval command generation means in association with the user name data and the command identification data;

command retrieval means, coupled to the command storage means, for reading the data retrieval command from the command storage means according to the user name data and the command identification data; and reuse command display means, coupled to the command retrieval means, for displaying the data retrieval command which is found by the command retrieval means;

reuse edit command entry means, coupled to the reuse command display means, for allowing the user to enter an edit command for modifying the data retrieval command displayed;

reuse modification means, coupled to the reuse edit command entry means, for modifying the data retrieval command according to the user edit command and transmitting its modified version to the retrieval execution means; and editable reuse means, coupled to the command retrieval means, for, when the data retrieval command is found by the command retrieval means, actuating the reuse edit command entry means for entry of the edit command and, when the data retrieval command is not found, actuating the dialogue means for amendment.

* * * * *

UNITED STATES PATENT AND TRADE MARK OFFICE
CERTIFICATE OF CORRECTION

PATENT NO. : 5,471,677  Page 1 of 2
DATED : November 28, 1995
INVENTOR(S) : Takeshi Imanaka It is certified that error appears in the above-identified patent and that said Letters Patent is hereby corrected as shown below:

Cover Sheet, in the Abstract, lines 13 and 14, after "range of" delete "inputs which produce an output that" and insert --input to produce the output which--.

Cover Sheet, in the Abstract, line 19, delete "device" and insert --means--.

Column 17, claim 1, line 58, after "displaying" delete --one--.

Column 18, claim 3, line 25, after "values and" delete "said" and insert --the--.

Column 18, claim 4, line 33, before "sizing" delete "said" and insert --the--.

Column 18, claim 5, line 35, after "dividing" insert --storage--.

Column 18, claim 5, line 38, after "displaying" delete --one--.

Column 18, claim 5, line 39, after "enter" delete "and" and insert --an--.

Column 19, claim 7, line 6, after "displaying" delete --one--.

Column 19, claim 9, line 44, after "displaying" delete --one--.

Column 20, claim 11, line 17, after "displaying" delete --one--.

UNITED STATES PATENT AND TRADE MARK OFFICE
CERTIFICATE OF CORRECTION

PATENT NO. : 5,471,677
DATED : November 28, 1995
INVENTOR(S) : Takeshi Imanaka

It is certified that error appears in the above-identified patent and that said Letters Patent is hereby corrected as shown below:

Column 20, claim 11, line 27, change "satisfies" to --satisfy--.

Column 20, claim 11, line 43, change "retrieval-entry" to --retrieval entry--.

Column 20, claim 11, line 44, after "name" change "delta" to --data--.

Column 20, claim 11, lines 49 and 50, line 49, after "means" delete --and the command retrieval entry means--.

Column 21, claim 13, line 4, after "displaying" delete --one--.

Column 21, claim 13, line 32, delete "delta" and insert --data--.

Column 22, claim 13, lines 3 and 4, after "means" delete --and the command retrieval entry means--.

Signed and Sealed this

Twenty-third Day of July, 1996

Attest:

BRUCE LEHMAN

*Attesting Officer*     *Commissioner of Patents and Trademarks*